United States Patent [19]
Coulson

[11] 4,260,308
[45] Apr. 7, 1981

[54] SEALING DEVICES

[75] Inventor: Robert A. Coulson, Harwell, England

[73] Assignee: United Kingdom Atomic Energy Authority, London, England

[21] Appl. No.: 97,936

[22] Filed: Nov. 26, 1979

[30] Foreign Application Priority Data

Nov. 30, 1978 [GB] United Kingdom ............... 46751/78

[51] Int. Cl.$^3$ .............................................. B25J 3/00
[52] U.S. Cl. ................................................... 414/8
[58] Field of Search ...................................... 414/1-7, 414/8; 92/137; 277/237 R

[56] References Cited

U.S. PATENT DOCUMENTS

| | | | |
|---|---|---|---|
| 2,942,554 | 6/1960 | Gilchristi | 92/137 |
| 3,164,267 | 1/1965 | Jelatis et al. | 414/8 |
| 3,426,920 | 2/1969 | Chesley | 414/8 |

Primary Examiner—Robert I. Smith
Attorney, Agent, or Firm—Larson, Taylor and Hinds

[57] ABSTRACT

A sealing device for minimizing the leakage of toxic or radioactive contaminated environments through a biological shield along an opening through which a flexible component moves that penetrates the shield. The sealing device comprises an outer tubular member which extends over a length not less than the maximum longitudinal movement of the component along the opening. An inner sealing block is located intermediate the length of the component and is positioned in the bore of the outer tubular member to slide in the bore and effect a seal over the entire longitudinal movement of the component.

4 Claims, 6 Drawing Figures

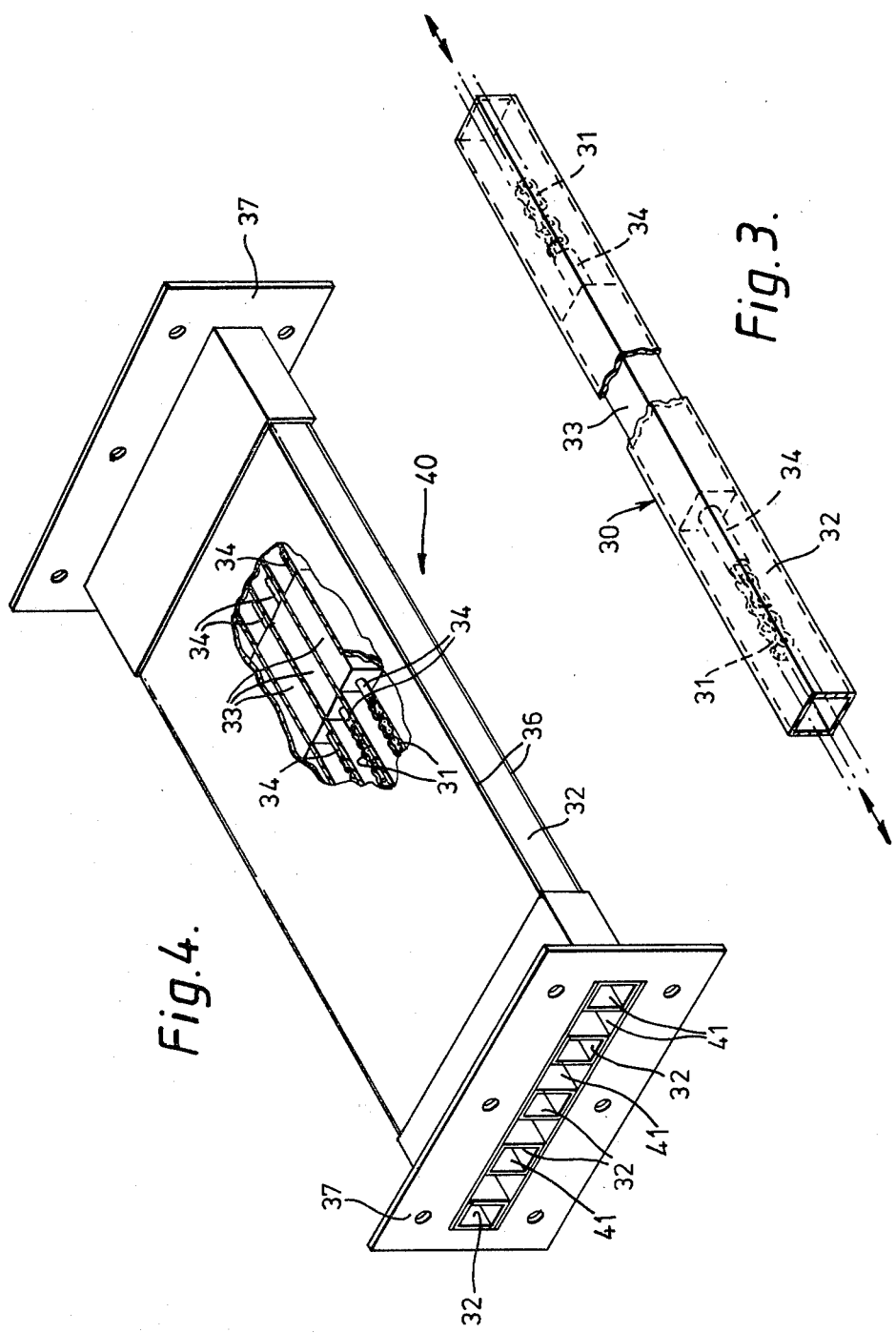

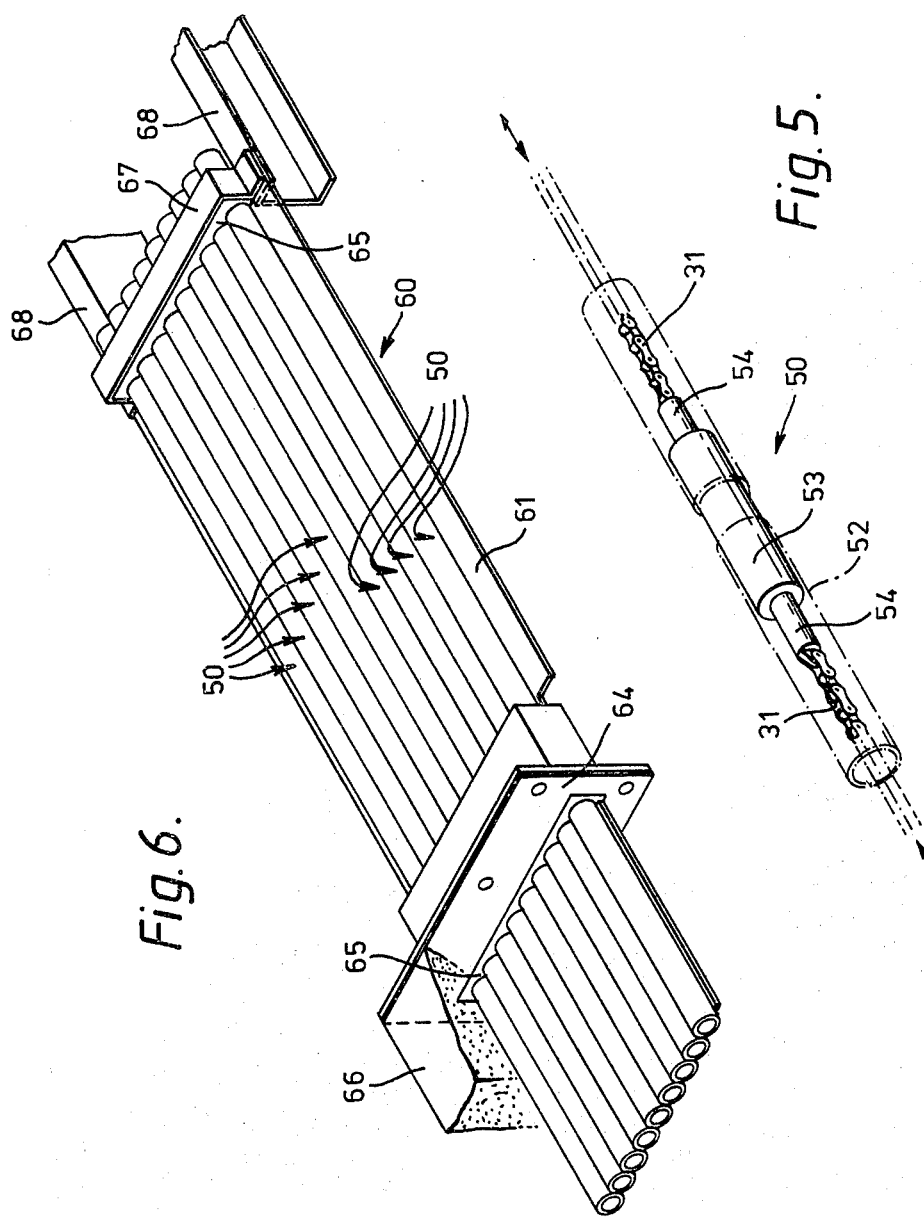

SEALING DEVICES

This invention relates to sealing devices and in particular to a sealing device for minimising the leakage of toxic or radioactive contaminated environments through biological shields along openings through which components move that penetrate the shield.

In a common form of remote controlled manipulator of the type known as a master/slave manipulator, a slave arm is connected to a master arm by means of flexible tensile load sustaining members such as cables, tapes or chains, which pass inside and along the length of a large diameter tube known as a through-tube assembly and move longitudinally therein. There is a need to inhibit contaminated air from leaking from the slave arm end of the through-tube assembly back through the through-tube assembly without restricting the movement of the cables, tapes or chains. It is the practice to maintain the environment at the slave arm end at a negative pressure with respect to the environment at the master arm end so that leakage through the through-tube assembly is biased to flow into the contaminated environment at the slave arm end.

According to a first aspect of the present invention, there is provided a sealing device for use with a longitudinally movable elongate flexible member adapted to sustain a tensile load, the device comprising an outer member having a duct therethrough which duct extends over a length not less than the maximum longitudinal movement of the flexible member, and an inner sealing member adapted to be positioned intermediate the ends of the flexible member and located with the flexible member in the duct so as to slide and maintain a seal therein over the longitudinal movement of the flexible member.

According to a second aspect of the present invention there is provided an assembly of sealing devices for a plurality of adjacent longitudinally movable, elongate flexible members, each flexible member being adapted to sustain a tensile load, each sealing device comprising an outer member having a duct therethrough, which duct extends over a length not less than the maximum longitudinal movement of a respective said flexible member, and an inner sealing member adapted to be positioned intermediate the ends of the respective flexible member and located with the respective flexible member in the duct so as to slide and maintain a seal therein over the longitudinal movement of the respective flexible members.

The or each duct may be of circular shape, and the or each inner sealing member may comprise a cylindrical block which is a sliding fit in the duct and may comprise polytetrafluoroethylene, or nylon impregnated with molybdenum.

According to a third aspect of the present invention, there is provided a master/slave manipulator comprising a master arm assembly, a slave arm assembly, and a through-tube assembly, the through-tube assembly being provided with a sealing device of the first aspect or an assembly of sealing devices of the second aspect of the present invention.

The invention will now be further described by way of example only with reference to the accompanying drawings, in which FIG. 1 shows a side view of a master/slave manipulator;

FIG. 3 shows a perspective diagrammatic view of one form of sealing device for use with the flexible member of FIG. 2;

FIG. 4 shows to a reduced scale a perspective cutaway view of part of a sealing device constituted by an assembly of the sealing devices of FIG. 3;

FIG. 5 shows a perspective view of an alternative form of sealing device to that of FIG. 3, and FIG. 6 shows to a reduced scale a perspective view of an assembly of the sealing devices of FIG. 5.

Figure 1:
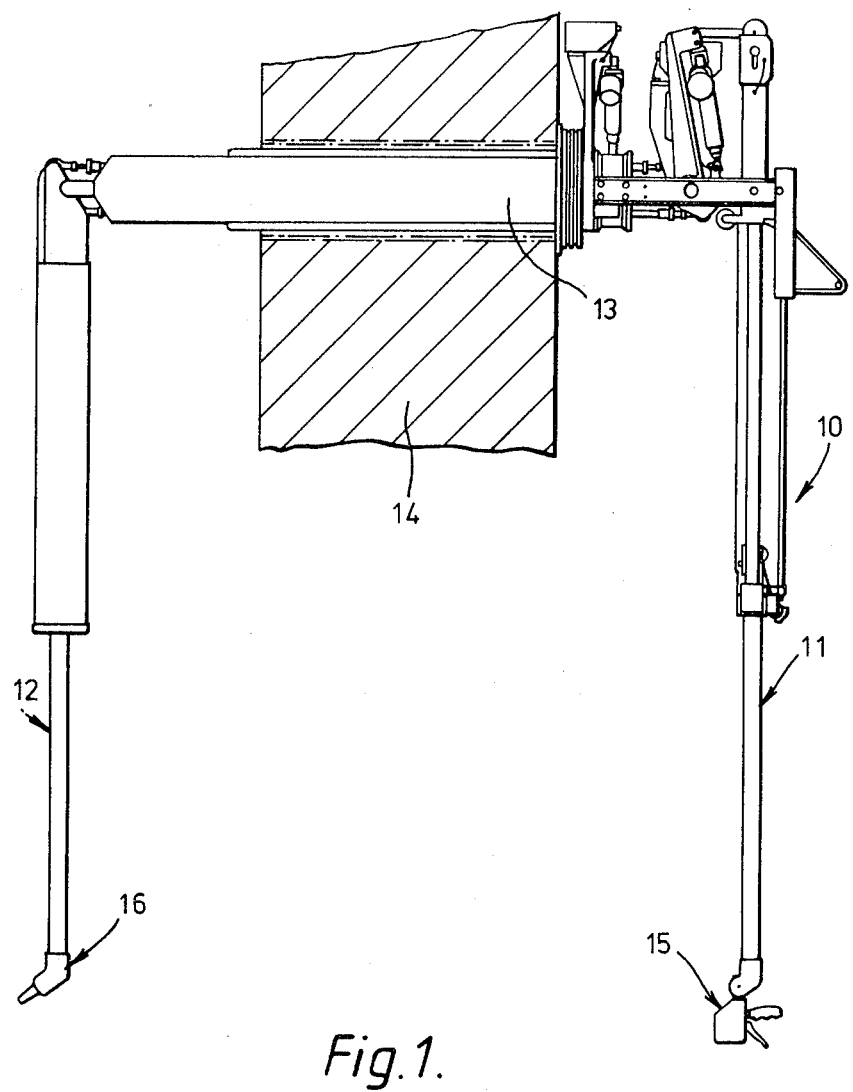
Figure 2:
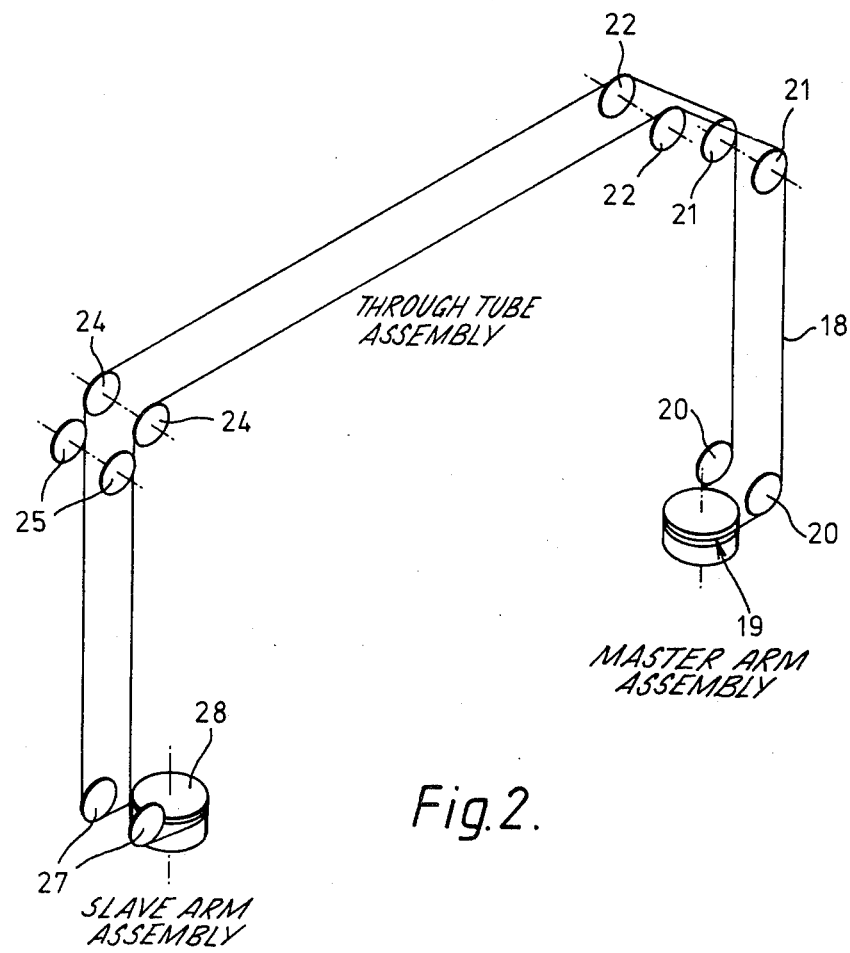
FIG. 2 shows a diagrammatic representation of a flexible member for transmitting movement in the manipulator of FIG. 1.

Referring now to FIG. 1, a master/slave manipulator 10 is shown having a master arm assembly 11, and a slave arm assembly 12 connected together through a through-tube assembly 13 positioned in a biological shield 14. A wrist assembly 15 at the lower end of the master arm assembly 11 controls the movements of a jaw assembly 16 at the corresponding end of the slave arm assembly 12. In a known manner, these movements are effected by use of flexible tensile load sustaining members (not shown in FIG. 1), for example chains, a typical run being shown in FIG. 2 to which reference is made. In FIG. 2, an endless flexible tensile load sustaining member 18 is driven by a driver member 19 rotatable on an axis parallel to the longitudinal axis of the master arm assembly 11, and runs on the underside of two lower wheels 20 and over two pairs of upper wheels 21, 22 respectively. The member 18 then runs horizontally through to the slave arm assembly 12, moving over pairs of upper wheels 24, 25 respectively down to and under a pair of lower wheels 27 and around a driven wheel 28. It can be seen that rotation of the driver member 19 results in a corresponding rotation of the driven wheel 28 in the slave arm assembly 12. Similar arrangements are made for most movements of the master/slave manipulator 10.

In order to maintain the environments separate between the master arm assembly 11 and the slave arm assembly 12, a seal is provided as shown in FIG. 3 in which a sealing device 30 is attached at each end to a steel chain 31 which corresponds to the flexible member 18 of FIG. 2. The sealing device 30 comprises an outer member 32 made of rectangular cross-section tube located in the through-tube assembly 13 of FIG. 1, and an inner elongate rectangular cross-section block 33 made of polytetrafluoroethylene (P.T.F.E.) and located in a duct provided by the bore of the outer member 32. The block 33 is a sliding fit in the bore of the outer member 32, and is provided with a connector 34 at each end face thereof for connection to the chain 31. The block 33 is thereby effectively positioned at a region intermediate the ends of the chain 31, and although the chain 31 actually terminates at each connector 34 the effect is the same as if the chain 31 passed through the block 33 without a break. The outer member 32 extends over a length equal to or greater than the expected maximum movement of the chain 31 along the bore of the outer member 32 so that a seal is maintained between the block 33 and the outer member 32 throughout the entire longitudinal movement of the chain 31, and the rectangular cross-sectional shape of the block 33 and the bore of the outer member 32 prevent the chain 31 twisting about its longitudinal axis.

As a plurality of parallel chains pass along the through-tube assembly 13 of FIG. 1 and it is necessary to allow the slave arm assembly 12 of FIG. 1 to rotate about the longitudinal axis of the through-tube assembly 13 relative to the master arm assembly 11, this requires that at each end of the through-tube assembly 13 the chains 31 maintain their correct attitude relative to the respective wheels (sprockets) they engage whilst allowing the chains 31 to twist along their length to accommodate the differential rotation of the slave arm assembly 12 relative to the master arm assembly 11 as shown in FIG. 4.

Referring to FIG. 4, five outer members 32 identical to that shown in FIG. 3 are arranged parallel to one another and spaced apart, and are joined together using an adhesive such as Araldite by two sheets 36 made of plastics material manufactured under the Registered Trade Mark "Warite" to provide an assembly 40 having nine rectangular bores 41 therethrough, each end of the assembly 40 being provided with a mounting flange 37 for securing the assembly 40 in a gas tight manner to an end plate (not shown) of respectively the master arm assembly 11 and the slave arm assembly 12 of a master/slave manipulator of FIG. 1.

A rectangular P.T.F.E. block 33 identical to that shown in FIG. 3 is provided in each bore 41 and connected intermediate the length of a chain 31 so that in effect there are nine sealing devices 30 identical to that shown in FIG. 3 and constituting a single sealing device in the form of the assembly 40.

With the assembly 40 of FIG. 4, the mounting flanges 37 can be twisted relative to each other in parallel planes without restricting the longitudinal movement of any of the chains 31 whilst maintaining an effective seal between each bore 41 and the block 33 located therein.

Referring now to FIG. 5, a sealing device 50 is shown which is identical in most respects to the sealing device 30 of FIG. 3, except that it has an outer member 52 in the form of a circular cross-section stainless steel tube within which a circular cross-section P.T.F.E. block 53 locates as a sliding fit. The block 53 has a connector 54 at each end face for connection to a chain 31. The outer member 52 extends over a length equal to or greater than the expected maximum longitudinal movement of the chain 31 inside the outer member 52.

As shown in FIG. 6 to which reference is made, several sealing devices 50 (nine are shown) of FIG. 5 may be arranged together in a parallel array 60 on a "Warite" plastics sheets 61. Near one end of the array 60 which connects to a slave arm (not shown), the sealing devices 50 and the sheet 61 extend through a mounting flange 64 for securing the array 60 to a shielding block 66, the space between the sealing devices 50 and the inside of the mounting flange 64 being filled with an elastomeric sealant 65, such as Devcon Flexane 30 supplied by Devcon Limited, Theale, Berkshire, England. At the other end of the array 60 which connects with a master arm (not shown), the sealing devices 50 are clamped by a bridging member 67 to two spaced apart channel members 68, the sealant 65 being used to seal the space between the sealing devices 50 and the member 67. The array 60 is capable of being twisted at the bridging member 67 in a plane parallel to the mounting flange 64.

It will be understood that the outer members 32, 52 extend to the master arm assemblies 11 and the slave arm assemblies 12 of the master/slave manipulator to allow the chains 31 to run through the assemblies 11, 12 in a similar manner to that shown in FIG. 2.

Tests on one assembly of sealing devices similar to that of FIG. 6 have shown that a maximum leak rate as low as 0.2 cu ft/min can be achieved from the assembly.

Although the invention has been described in relation to flexible tensile load sustaining members in the form of chains, other such flexible members such as tapes or cables may be used.

It will be understood that ducts and corresponding sealing blocks may be used of alternative cross-sectional shape to those of FIGS. 3 to 6. Furthermore, the sealing blocks may be of an alternative material, for example nylon impregnated with molybdenum (Nylatron) and supplied by Polypenco Limited, Gate House, Welwyn Garden City, Hertfordshire, England, or may be essentially metallic.

I claim:

1. A master/slave manipulator comprising a master arm assembly, a slave arm assembly, a through-tube assembly adapted to connect together the master arm assembly and the slave arm assembly, and longitudinally movable, elongate flexible members adapted to sustain a tensile load and arranged to transmit motion from the master arm assembly to the slave arm assembly through the through-tube assembly, wherein the improvement comprises, an assembly of sealing devices in the through-tube assembly, each sealing device comprising, an outer member having a duct therethrough, which duct extends over a length not less than the maximum longitudinal movement of a respective said flexible member, and an inner sealing member adapted to be positioned intermediate the ends of the respective flexible member, said inner sealing member being located in the duct so as to slide and maintain a seal therein over the longitudinal movement of the respective flexible member.

2. A manipulator as claimed in claim 1, wherein each duct is of circular form and the inner sealing member therein comprises a cylindrical block.

3. A manipulator as claimed in claim 1, including the outer members being aligned in parallel adjacent relationship, a flat sheet upon which the outer members are disposed, a mounting flange having a duct therethrough and through which the outer members and the sheet extend, and an elastomeric sealant filling the spaces between the flange, the outer members, and the sheet.

4. A manipulator as claimed in claim 3, including a mounting comprising a bridging member near one end of the outer members, elastomeric material packed between the outer members and the bridging member, and two spaced apart support members which support the sheet and to which support members the bridging member is secured.

* * * * *